US008145687B2

(12) United States Patent
Nakashiro et al.

(10) Patent No.: US 8,145,687 B2
(45) Date of Patent: Mar. 27, 2012

(54) FILE DETECTION DEVICE AND METHOD

(75) Inventors: Koki Nakashiro, Atsugi (JP); Yukio Ogawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 413 days.

(21) Appl. No.: 12/527,167

(22) PCT Filed: Apr. 8, 2009

(86) PCT No.: PCT/JP2009/057540
§ 371 (c)(1),
(2), (4) Date: Aug. 13, 2009

(87) PCT Pub. No.: WO2010/116539
PCT Pub. Date: Oct. 14, 2010

(65) Prior Publication Data
US 2011/0184970 A1    Jul. 28, 2011

(51) Int. Cl.
*G06F 17/30* (2006.01)
(52) U.S. Cl. ..................................... 707/822
(58) Field of Classification Search .................. 707/802, 707/826, 827, 672, 688, 695
See application file for complete search history.

(56) References Cited

U.S. PATENT DOCUMENTS

| | | | | |
|---|---|---|---|---|
| 6,192,365 B1* | 2/2001 | Draper et al. | ................. | 707/648 |
| 7,912,866 B2* | 3/2011 | Borthakur et al. | ............ | 707/802 |
| 8,010,491 B2* | 8/2011 | Edelstein et al. | ............. | 707/638 |
| 2002/0190871 A1* | 12/2002 | Stanfield et al. | ......... | 340/825.49 |
| 2005/0114406 A1* | 5/2005 | Borthakur et al. | ............. | 707/200 |
| 2005/0267916 A1* | 12/2005 | Tone et al. | .................... | 707/200 |
| 2008/0126374 A1* | 5/2008 | Borthakur et al. | ............. | 707/100 |

FOREIGN PATENT DOCUMENTS

JP    2008052570    3/2008

OTHER PUBLICATIONS

Y. Matsubara, et al "Development of a Desktop Search System Using Correlation between User's Schedule and Data in a Computer", Graduate School of Humanities and Sciences, Advanced Sciences, 2007 IEEE WIC.ACM International Conferences on Web Intelligence and Intelligent Technology-Workshops, pp. 235-238.
T. Morita, et al "Desktop Search System Based on the Action-Oriented Algorism", NTT Cyber Solutions Laboratories, 4 pages.
U.S. Appl. No. 12/324,965, filed Nov. 28, 2008, Yukio Ogawa.

* cited by examiner

*Primary Examiner* — Cam-Linh Nguyen
(74) *Attorney, Agent, or Firm* — Brundidge & Stanger, P.C.

(57) ABSTRACT

Since no access history is generated for when a file update which makes use of a copy and paste function is performed, it is difficult to detect the file that served as the reference source during the update. Hence, the present invention is provided to manage a client access history for each file that is stored in a storage device, and detect a file, which has been accessed between a time when a corresponding user logs into the storage device and a time when an updated file is updated based on information of the access history, as the reference source for the updated file.

7 Claims, 11 Drawing Sheets

FIG.2

| Date | Time | Host | User | IP | Action | Desc. | File Path | |
|---|---|---|---|---|---|---|---|---|
| 24 Nov. 2008 | 09:18:00 | sss1 | ken | 192.168.0.1 | open | OK\|R | /CustomListA.xls | ~201 |
| 24 Nov. 2008 | 09:18:10 | sss1 | ken | 192.168.0.1 | close | OK | /CustomListA.xls | ~202 |
| 24 Nov. 2008 | 09:18:15 | sss1 | ken | 192.168.0.1 | open | OK\|R | /CustomListB.xls | ~203 |
| 24 Nov. 2008 | 09:18:25 | sss1 | ken | 192.168.0.1 | close | OK | /CustomListB.xls | ~204 |
| 24 Nov. 2008 | 09:18:30 | sss1 | ken | 192.168.0.1 | open | OK\|R | /CustomListC.xls | ~205 |
| 24 Nov. 2008 | 09:18:40 | sss1 | ken | 192.168.0.1 | close | OK | /CustomListC.xls | ~206 |
| 24 Nov. 2008 | 09:18:45 | sss1 | ken | 192.168.0.1 | open | OK\|W | /CustomList1.xls | ~207 |
| 24 Nov. 2008 | 09:18:55 | sss1 | ken | 192.168.0.1 | close | OK | /CustomList1.xls | ~208 |
| ⋮ | ⋮ | ⋮ | ⋮ | ⋮ | ⋮ | ⋮ | ⋮ | 123 |
| 123A | 123B | 123C | 123D | 123E | 123F | 123G | 123H | |

FIG.3

| Date | Time | login/logout | User | |
|---|---|---|---|---|
| 24 Nov. 2008 | 09:17:00 | login | ken | ～302 |
| 24 Nov. 2008 | 10:50:10 | logout | ken | ～303 |
| 24 Nov. 2008 | 11:00:20 | login | taro | ～304 |
| ⋮ | ⋮ | ⋮ | ⋮ | 301 |
| 301A | 301B | 301C | 301D | |

FIG.4

| Changed File | Refer Files | Same Flags |
|---|---|---|
| /CustomList1.xls | /CustomListA.xls , /CustomListB.xls , /CustomListC.xls | 0, 1, 0.8 |
| ⋮ | ⋮ | ⋮ |

401

401A  401B  401C

FILE DETECTION DEVICE AND METHOD

TECHNICAL FIELD

The present invention relates to a file detection device and method suitably applied to, for example, Network Attached Storage (NAS).

BACKGROUND ART

A user creates some contents such as document, image, voice-related or others using an application program installed on a client Personal Computer (PC) or the like. These contents are usually stored as a file on a hard disk which the client PC comprises.

However, the hard disk which the client PC comprises has a small capacity and lack of preventing disk failure, and sometimes files can no longer be utilized due to breakdown of the hard disk.

Hence, there have been a large number of cases where a large-capacity network-connection storage device (NAS) fitted with Redundant Arrays of Inexpensive Disks (RAID) technology is installed and a network is constructed so that files created on a client PC can be saved in this NAS.

In recent years, files created on individual client PCs have widely been managed by aggregating the files in a large-capacity storage device that is connected to a network, for the sake of performing file monitoring for internal regulation of an enterprise or for the purpose of information management catering to electronic disclosure (e-Discovery), and so forth.

Furthermore, the following two investigative methods may be used when investigating how the content of a file saved in a storage device has been appropriated by a third party (when checking how a file that has been leaked outside the company has been used on a file server, for example).

The first investigative method entails seeking a file with the same content by comparing the content of files that have been saved in the storage device.

The second investigative method entails tracking the file access history. An investigation using this second investigative method is executed by making use of the fact that tracking is possible because, when a file is copied, operations such as the copy operation and file name change operation remain in the file access history. A technology which is related to this second investigative method is the technology disclosed in Japanese Unexamined Patent Application No. 2008-52570, for example, which makes it possible to manage a file operation history in a database and detect an object file on the basis of the date and time in order to make it easy to track file name changes and so forth.

However, the first investigative method is confronted by the problem that, due to the number of files saved in the storage device, there is a large number of combinations of files to be compared and it takes considerable effort and time to compare and inspect all of these file combinations.

Further, the second investigative method is faced by the problem that, because associated files are tracked solely based on a change in file name, information which can be tracked in the access history does not remain when the file is copied as content using 'copy and paste' and the like. It is therefore difficult to find the appropriation destination file.

In addition, a method that entails installing an agent program to govern the Operating System (OS) of a client PC and successively recording user file operations may also be considered but this makes the task of managing the client PC an enormous one. There is then the risk that the client PC will operate in an unstable manner.

DISCLOSURE OF THE INVENTION

The present invention considers the above points and proposes a file detection device and method that make it easier to detect files that are related due to referencing as mentioned earlier.

In order to solve this problem, the present invention is a file detection device for detecting a specified file among a plurality of files stored in a storage device, comprising an access history management unit for managing an access history of a client with respect to individual files that constitute the plurality of files; and a file detection unit for detecting a file, which is accessed between a time when a corresponding user logs into the storage device and a time when any of the plurality of files is updated on the basis of information of the access history, as a reference source candidate for the updated file.

Further, the present invention is a file detection method for detecting a specified file among a plurality of files stored in a storage device, comprising a first step of managing an access history of a client with respect to individual files that constitute the plurality of files; and a second step of detecting, as a reference source candidate for an updated file, a file that is accessed between a time when a corresponding user logs into the storage device and a time when any of the plurality of files is updated, on the basis of information of the access history.

The present invention is capable of facilitating the search for a file which is related to an updated file due to referencing because the present invention is able to limit the files which could have been referenced when the updated file was updated.

BRIEF DESCRIPTION OF THE DRAWINGS

FIG. 2 is a table showing the configuration of a file access history table;

FIG. 3 is a table showing the configuration of a user login history table;

FIG. 4 is a table showing the configuration of a reference source candidate table;

BEST MODE FOR CARRYING OUT THE INVENTION

An embodiment of the present invention will be described in detail hereinbelow.

(1) First Embodiment

(1-1) The Configuration of the Network System According to this Embodiment

Figure 1:
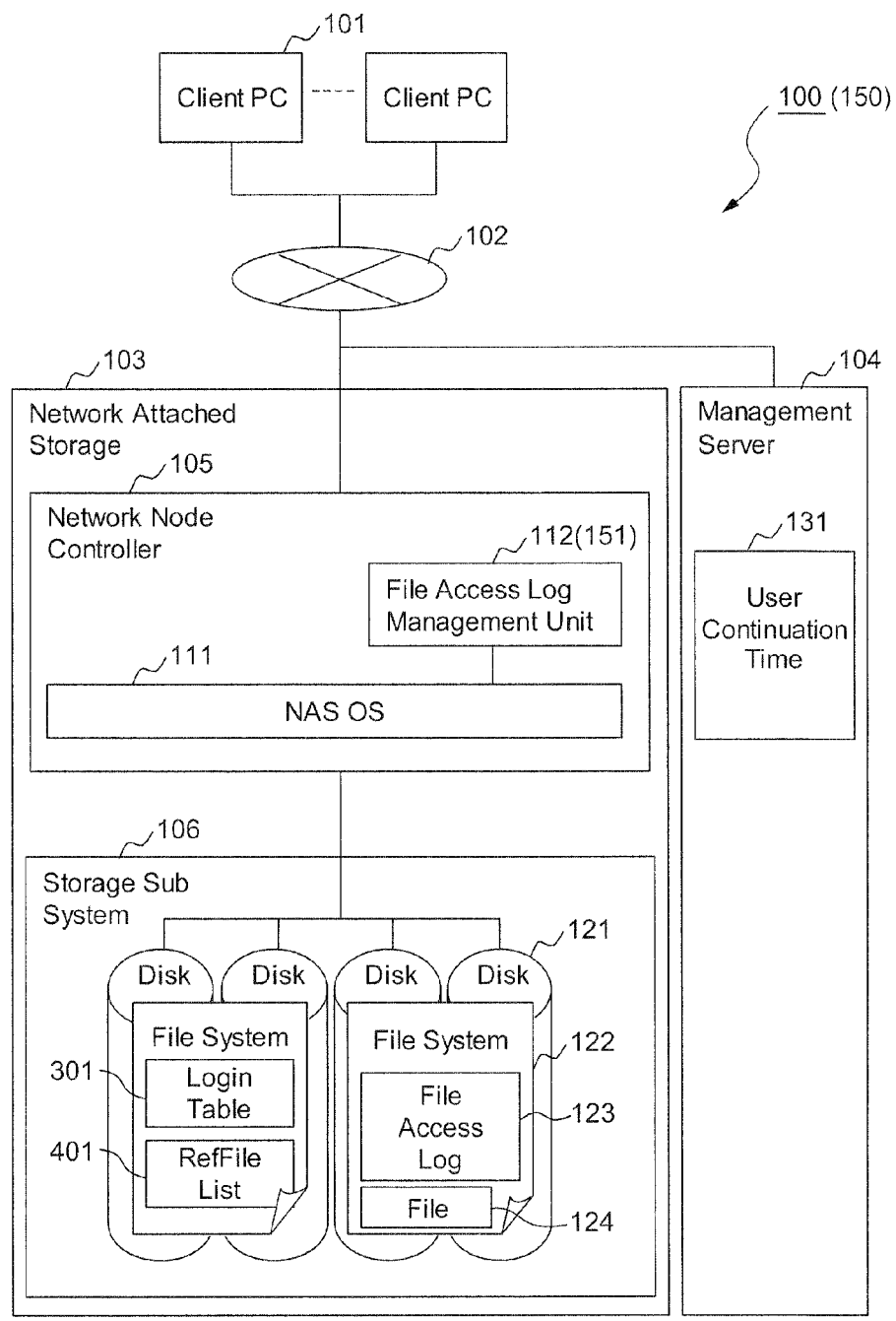
FIG. 1 is a block diagram showing the overall configuration of a network system according to first and second embodiments.

In FIG. 1, 100 represents an overall network system of this embodiment. The network system 100 comprises one or a plurality of client PCs 101, a NAS 103, and a management server 104, which are connected via a network 102.

The client PC 101 is a terminal which is used by the user and performs file access with respect to a network node controller 105, and comprises a Central Processing Unit (CPU) and a memory or other information processing resource.

The network 102 is constituted by general communication paths via which communication packets are transferred in accordance with an Internet Protocol (IP) or the like, such as the Internet, an Intranet, or a communication network that combines the Internet and an Intranet.

The NAS 103 is constituted comprising the network node controller 105 and a storage subsystem 106, and provides the client PC 101 with file sharing services.

The network node controller 105 comprises an NAS OS 111, which is an operating system for providing file access via the network 102, and a file access history management unit 112 for managing a file access history, and provides file access services upon receiving a file access request from the client PC 101. In this case, the file access history management unit 112 may also be constituted by hardware or software. The file access services provided by the network node controller 105 are Common Internet File System (CIFS), Network File System (NFS), or Web-based Distributed Authoring and Versioning (WebDAV), and the like.

If the file access history table 123 is made accessible via the NAS OS 111, the file access history management unit 112 may also be disposed in an external server different from the network node controller 105.

The storage subsystem 106 is a storage device that provides the client PC 101 and the network node controller 105 with a storage region for storing files. The storage subsystem 106 is connected to the network node controller 105 via a storage network interface such as an Institute of Electrical and Electronic Engineers (IEEE) 802.3 interface, a Small Computer System Interface (SCSI), a Fibre Channel (FC) interface, a Universal Serial Bus (USB) interface or an IEEE 1394 interface and comprises a plurality of disks 121 for holding files.

The disk 121 stores a file system 122 that can be utilized by the client PC 101. Furthermore, the file system 122 comprises a file 124 and a file access history table 123 which are created by the user.

The file access history table 123 is a table which is for managing the usage statuses of files and, as shown in FIG. 2, is constituted by a date field 123A, a time field 123B, a host name field 123C, a user name field 123D, an IP address field 123E, an action field 123F, an operation result field 123G, and a file path field 123H.

Furthermore, the date field 123A and time field 123B store the date and time respectively when the corresponding file access was performed. The host name field 123C and IP address field 123E store an identifier (host ID) and the IP address of the client PC 101 that performed the file access respectively, and the user name field 123D stores an identifier of the user (user ID) who performed the file access.

Further, the action field 123F and operation result field 123G store the operation performed on the file during file access and the result of the operation (Description) respectively as flags, and the file path field 123H stores the full path name to the file accessed during the file access. The 'operation performed on the file' could be 'Open' or ' Close' of the file or the like and the 'result of the operation' could be success ('OK'), failure ('NG'), read ('R'), or update ('W') and so forth.

The file access history table 123 has a new entry added thereto each time the client PC 101 requests file access to the NAS 106 and stores information such as that mentioned earlier to each of the added entry fields.

The management server 104 is a server which is used by the administrator of the network system 100 to manage the whole network system 100, and is constituted by a personal computer, a workstation, or a mainframe, or the like, for example.

(1-2) Reference Source Candidate Detection Function

A reference source candidate detection function with which the NAS 103 is fitted will be described next. In the case of this embodiment, the NAS 103 is fitted with the reference source candidate detection function which, when a file is updated, detects candidates for files that could have been referenced when the file was updated, and displays these candidates for the user.

As means for fulfilling this function, the file system 122 in the NAS 103 comprises a user login history table 301 and a reference source candidate table 401 and the management server 104 comprises a user access time definition table 131.

Of these two tables, the user login history table 301 is a table for managing user logins and logouts with respect to the NAS 103 and, as shown in FIG. 3, is constituted by a date field 301A, a time field 301B, a log type field 301C, and a user name field 301D.

The log type field 301C stores the corresponding log type (login or logout) and the date field 301A and time field 301B respectively store the date and time when the login or logout was performed. In addition, the user field 301D stores the user name of the user who performed the login or logout.

The user login history table 301 is updated by a controller (not shown) which is in the storage subsystem 106, and governs control of the operation of the storage subsystem 106. More specifically, the controller adds a new entry to the user login history table 301 each time the user logs into the NAS 105 or logs out from the NAS 105, and stores information such as that detailed above in each field of the added entry.

The reference source candidate table 401 is a table for managing updates to files held in the storage subsystem 106 and, as shown in FIG. 4, is constituted by an updated file field 401A, a reference source file field 401B, and a match field 401C.

The updated file field 401A stores the file names of the updated files and the reference source file field 401B stores the file names of one or a plurality of files that could be the reference source for the updated file. The match field 401C stores the degree of matching between an updated file and files which could be the reference source thereof.

In addition, the user access time definition table 131 is a table for holding a global threshold value time. The global threshold value time is a threshold value for when judgment is made of whether a plurality of consecutive access events may be identified as a single sequence, based on the time interval for performing two access events, and is pre-defined by the administrator operating the management server 105. The global threshold value time will be described in detail subsequently.

Figure 5:
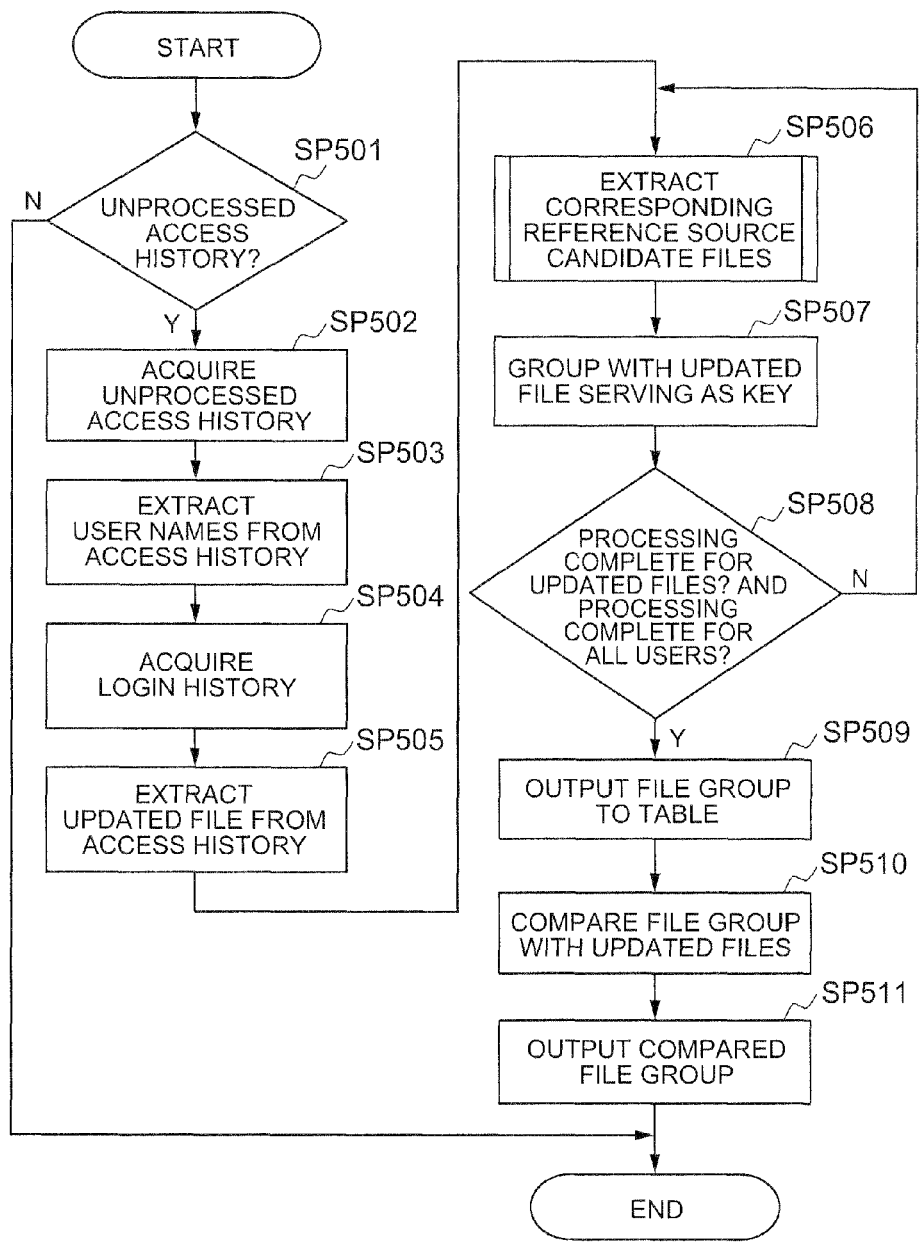
FIG. 5 is a flowchart showing a processing procedure for reference source candidate detection processing according to a first embodiment.

FIG. 5 shows the details of the processing by the file access history management unit 112 with respect to the reference source candidate detection function. The file access history management unit 112 executes the reference source candidate detection processing shown in FIG. 5 at regular intervals on the basis of a control program which is stored in memory (not shown) provided in the network node controller 105.

In other words, upon starting the reference source candidate detection processing, the file access history management unit 112 first references the file access history table 123 and judges whether an entry that has not undergone the processing of steps SP 502 to SP 511 (described subsequently) exists therein (SP 501).

Further, the file access history management unit 112 terminates the reference source candidate detection processing when this judgment yields a negative result. In contrast, the file access history management unit 112 reads information of all the entries from the file access history table 123 when the judgment yields an affirmative result (SP 502).

Further, the file access history management unit 112 detects all of the user names stored in the user name field 123D of these entries (SP 503).

The file access history management unit 112 then reads the times when each of the users with the user names detected in step SP 503 each logged in (which are called the 'login times' hereinbelow) as well as the times when the users each logged out (which are called the 'logout times' hereinbelow) from the user login history table 301 (SP 504).

The file access history management unit 112 then references the file access history table 123 and detects, for each of the users with the user names detected in step SP 503, all of the files which were accessed by the user between the login time and the logout time acquired in step SP 504, and updated at the time of access (called 'updated files' hereinbelow) (SP 505).

The file access history management unit 112 then selects one of the users with the user names detected in step SP 503, selects one updated file updated by the user from among the updated files detected in step SP 505, and detects all of the files which could have been referenced when the updated files were updated (such files are called 'reference source candidate files' hereinbelow) (SP 506).

Furthermore, the file access history management unit 112 then stores the reference source candidate file and the corresponding updated file detected in step SP 506 as one file group (SP 507).

The file access history management unit 112 then judges whether the processing of steps SP 506 and SP 507 above has been executed for all of the users and all of the updated files (SP 508), and repeats the same processing by returning to step SP 502 when this judgment yields a negative result (SP 506 to SP 508, SP 506).

The file access history management unit 112 then outputs information of each file group stored thus far to the reference source candidate table 401 when step SP 508 yields an affirmative result by completing the file grouping described earlier for all of the updated files of all of the users (SP 509).

In addition, the file access history management unit 112 sequentially compares the updated file and each corresponding reference source file for each file group to calculate the degree of matching therebetween, for all of the file groups which output information to the reference source candidate table 401 in step SP 509 (SP 510).

A tool which has a file comparison function such as the UNIX diff function can be utilized for this comparison. More specifically, the number of matching lines or bytes between the updated file (or changed files) and the reference source (or refer files) of the reference source candidate table 401 is acquired and the degree of matching is defined by dividing this number of matching lines or bytes by the number of lines or bytes of the reference source (or refer files). Here, the index (index information) of a search system can be acquired from both the updated file and the reference source candidate file and the degree of matching therebetween can also be obtained.

The file access history management unit 112 then stores the calculation result of step SP 10 in the match field 401C of the reference source candidate table 401 (SP 511). The file access history management unit 112 then terminates the processing to detect the reference source candidates.

The referencing relationship between the updated files detected in this manner and the reference source candidate files thereof can be displayed on the display of a management terminal (not illustrated) which is provided in the network node controller 105 of the NAS 103, for example.

A detection method for detecting reference source candidate files in step SP 506 of the reference source candidate detection processing will be described next in specific terms using FIG. 6.

Figure 6:
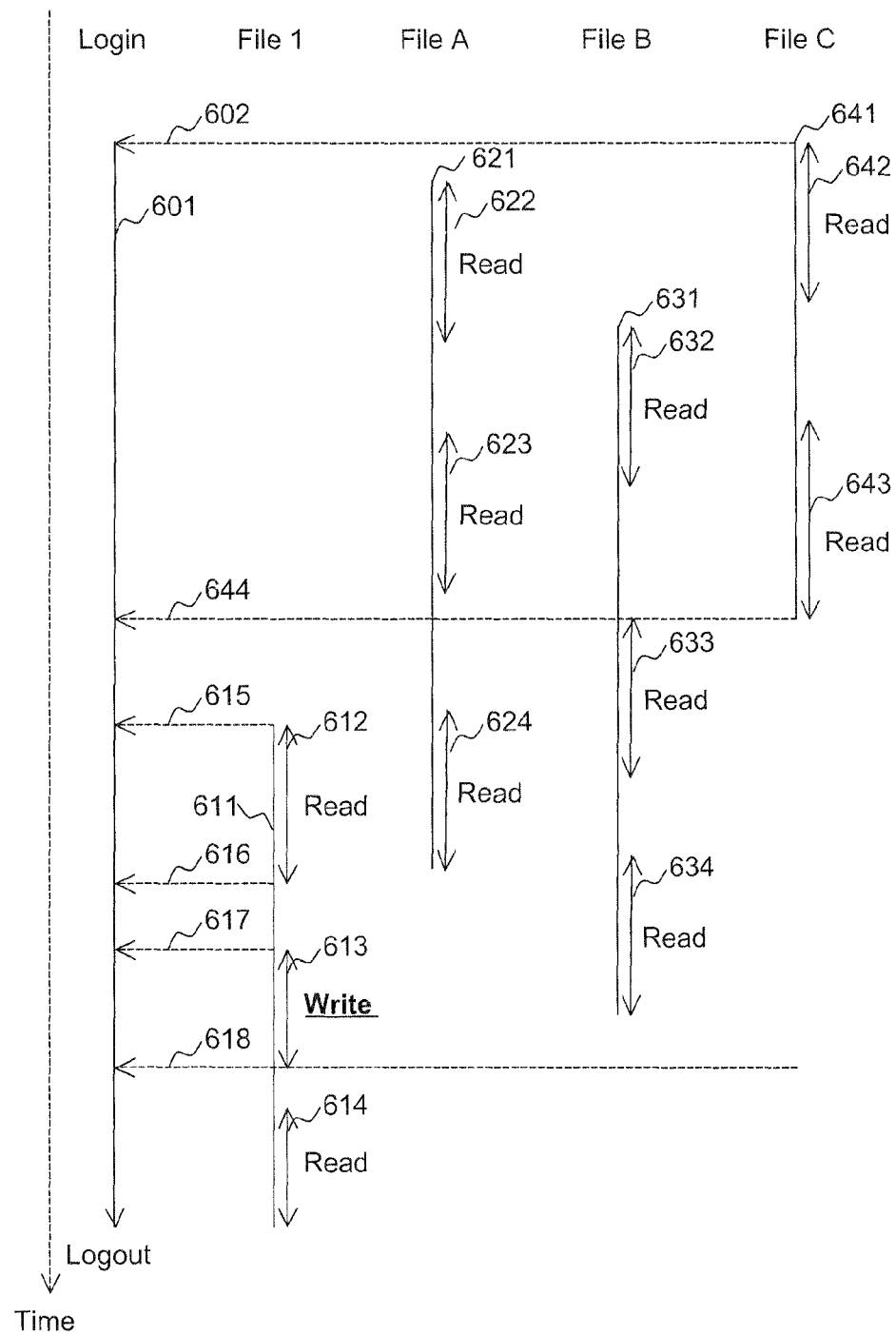
FIG. 6 is a time chart serving to illustrate a reference source file detection method.

As shown in FIG. 6, a certain user logs onto the NAS 103 when starting to use the NAS 103 and logs out when he or she has finished using the NAS 103 (arrow 601). In cases where the user performs access events 612 to 614, 622 to 624, 632 to 634, 642, and 643 on files ('File1', 'FileA', 'FileB', and 'FileC') between logging in and logging out, the execution time for an operation to open a file (which is suitably called the 'open operation time' hereinbelow) and the execution time for an operation to close a file (which is suitably called the 'close operation time' hereinbelow) during each of the access events 612 to 614, 622 to 624, 632 to 634, 642, and 643 are recorded in the file access history table 123.

In this case, when a file such as 'File1' is updated in access event 613 as per FIG. 6, for example, it is possible that the user will update 'File 1' by referencing 'FileA', 'FileB' and 'FileC', which are inspected before access event 613 is terminated (before 'File1' is closed).

The file access history management unit 112 therefore detects, as the reference source candidate files, all of the other files accessed by the user between the time of the file close operation (the time indicated by the arrow 618 in the example of FIG. 6) in the access event in which the file update was performed and the login time of the preceding user (the time indicated by the arrow 602 in the example of FIG. 6), on the basis of the open operation time and close operation time of each file recorded in the file access history table 123 in step SP 506 of the reference source candidate detection processing.

Thereupon, the file access history management unit 112 identifies these two access events as one sequence in cases where the time interval between a certain access event with respect to one file and the next access event (the time interval between the time the file is closed and the time the file is next opened) falls within the global threshold value time defined in the user access time definition table 131. Furthermore, the file access history management unit 112 identifies these two access events as different access events when the global threshold value time is exceeded by the time interval between a certain access event with respect to one file and the next access event.

For example, in FIG. 6, when the time interval between access events 612 and 613 with respect to 'File1' and the time interval between the access events 613 and 614 with respect to 'File1' both fall within the global threshold value time, the file access history management unit identifies these three access events 612 to 614 as one sequence 611.

Similarly, in FIG. 6, when the time interval between the access events 622 and 623 with respect to 'FileA' and the time interval between the access events 623 and 634 with respect to 'FileA' both fall within the global threshold value time, the file access history management unit identifies the three access events 622 to 624 each as one sequence 621.

Figure 7:
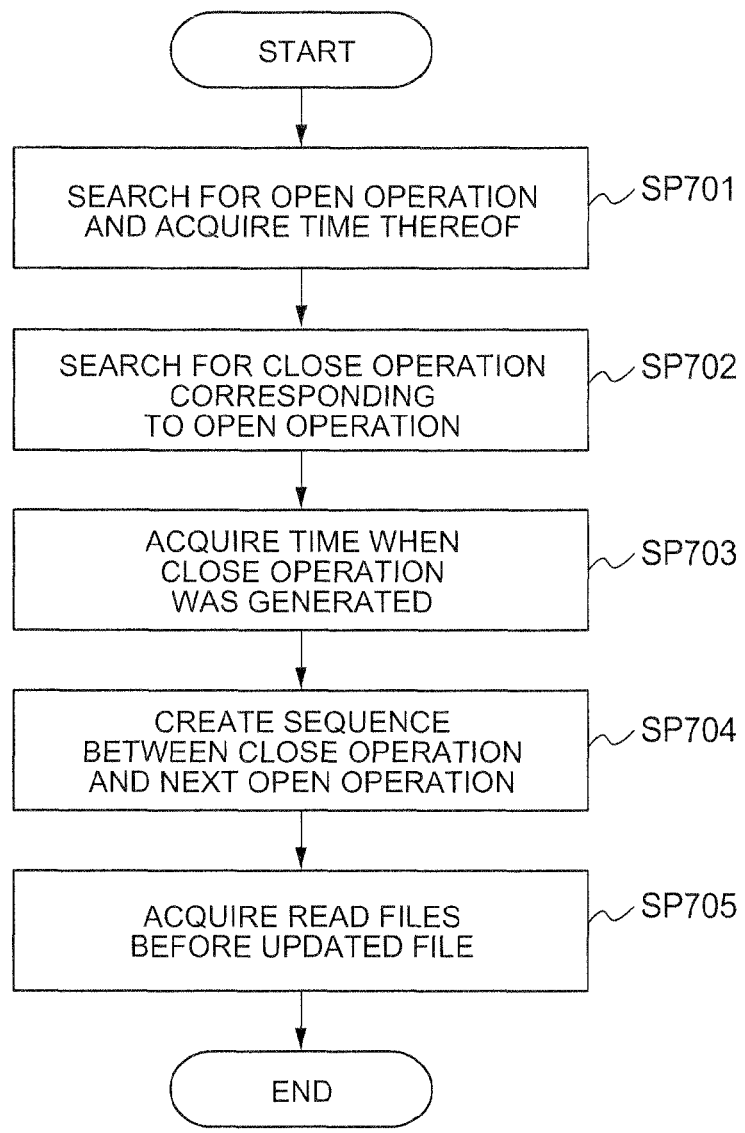
FIG. 7 is a flowchart showing a processing procedure for file detection processing according to the first embodiment.

FIG. 7 shows specific processing content of file access history management unit 112 when detecting such a reference source candidate file.

The file access history management unit 112 starts file detection processing shown in FIG. 7 when advancing to step SP 506 of the reference source candidate detection processing (FIG. 5) and first searches the user login history table 301 for file open operations that were executed between the login time and the logout time of the target user at the time which were acquired in step SP 504 of the reference source candidate detection processing, and then acquires the execution times for all of the detected open operations (SP 701).

The file access history management unit 112 then searches the file access history table 123 for close operations corresponding to each of the open operations whose execution times were acquired in step SP 701 (SP 702) and acquires the execution times of each of the detected close operations (SP 703).

The file access history management unit 112 then performs processing, which serves to bring together a plurality of access events as a single sequence by means of the method mentioned earlier using FIG. 6 on the basis of the open operation time and the close operation time of each file acquired as described earlier, on all of the files accessed between the user login time and the user logout time (SP 704).

The file access history management unit 112 then detects, as reference source candidate files, all of the files for which there is file access after the user login time directly before the execution time and before the file close operation time of the access event in which the target file at the time (updated files detected in step SP 5 of the reference source candidate detection processing), on the basis of the very first file open operation time and the final close operation time of each sequence created in step SP 704, and the open operation time and the close operation time and the like of other access events and unconcluded access events as a sequence (SP 705).

Furthermore, the file access history management unit 112 then terminates the file detection processing (1-3) Results of this Embodiment In the network system 100 of this embodiment as described earlier, when a certain file is updated, other files, which are accessed between a time when the user logs onto the NAS 103 and a time when the certain file is accessed, are grouped and the degree of matching between these files and the updated file is detected in each case. This therefore makes it easier to detect files (reference source candidate files) which could be the reference source for the updated file.

In this case, because the processing above is executed on the NAS 103 in this embodiment, there is no need to install an agent application on the client PC 101 to append an ID to the files or prohibit copy and paste and so forth, and a corresponding improvement in the stability of the client PC 101 and a corresponding reduction in management costs can be achieved.

(2) Second Embodiment

The second embodiment will be described next. In the first embodiment, in step SP 506 of the reference source candidate detection processing in FIG. 5, a reference source candidate file for the updated file was detected based on the close operation time of a target updated file, and the user login time.

In contrast, the network system 150 (FIG. 1) of this embodiment differs from the network system 100 of the first embodiment in that files that are accessed in the same time zone as the updated file targeted at the time are detected as the reference source candidate files.

Therefore, in the case of the example of FIG. 6, for example, according to the first embodiment, all of 'FileA' to 'FileC' are detected as reference source candidate files as mentioned earlier. However, in the second embodiment, 'File C', with which there is no temporal overlap with respect to user access with the sequence containing the access event in which 'File1' is updated, is not detected as a reference source candidate file.

Figure 8:
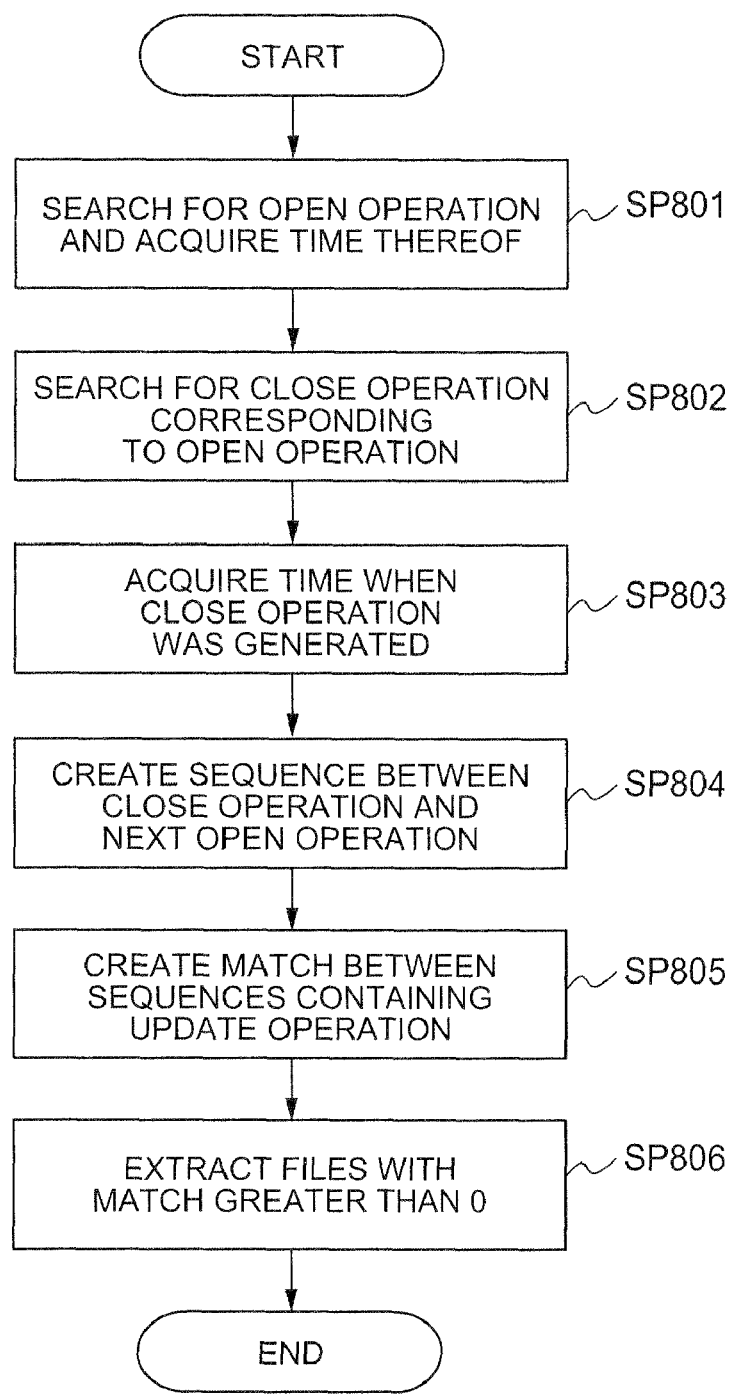
FIG. 8 is a flowchart showing a processing procedure for file detection processing according to the second embodiment.

FIG. 8 shows the processing procedure of the file detection processing according to the second embodiment which is executed in lieu of the processing of FIG. 7 by a file access history management unit 151 (FIG. 1) in step SP 506 of the reference source candidate detection processing (FIG. 5).

Upon advancing to step SP 506 of the reference source candidate detection processing, the file access history management unit 151 starts the file detection processing and processes steps SP 801 to SP 804 in the same way as steps SP 701 to SP 704 in FIG. 7.

Thereafter, the file access history management unit 151 calculates, in each of the sequences created in step SP 804, the sequences or access events (when the access events are not contained in a sequence) for target updated files (updated files detected in step SP 5 of the reference source candidate detection processing), and the proportion of temporal overlap between other sequences or access events, as the degree of matching therebetween (SP 805).

The file access history management unit 151 subsequently detects the files corresponding to each sequence and access event for which the degree of matching calculated in step SP 805 is greater than '0', as reference source candidate files (SP 806).

As described earlier, according to this embodiment, files which are accessed in the same time zone as the updated file are detected as reference source candidate files. Hence, in comparison with the first embodiment, files that are accessed in a shorter time than the updated file can be extracted as reference source candidate files and reference source candidate files can correspondingly be detected through more careful selection than in the first embodiment.

(3) Third Embodiment

Figure 9:
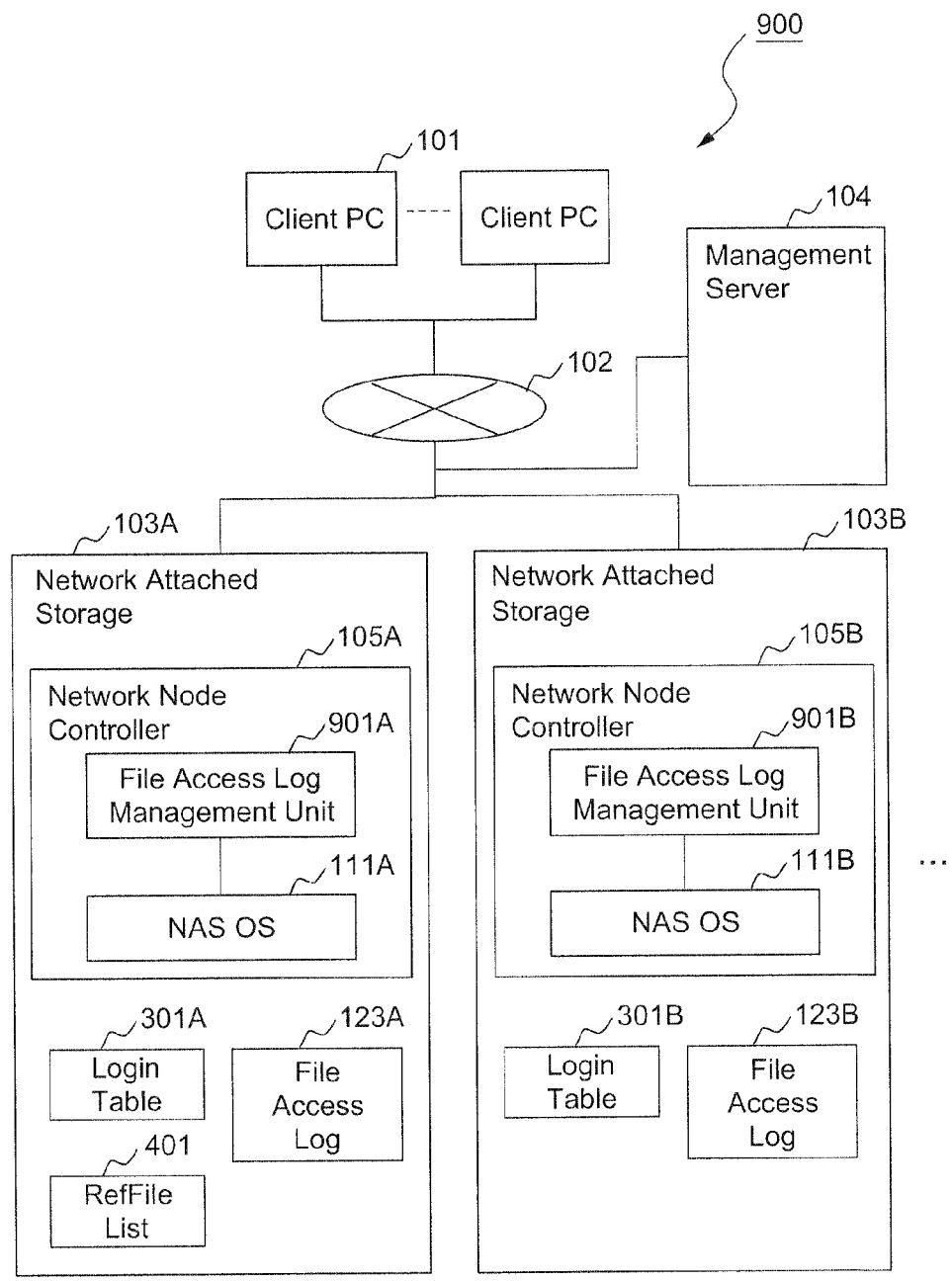
FIG. 9 is a block diagram showing the overall configuration of a network system according to a third embodiment.

FIG. 9, in which the same reference numerals are assigned to those parts corresponding to FIG. 1 or a suffix 'A' or 'B' is appended to the same reference numerals, shows a network system 900 according to the third embodiment. In this network system 900, a plurality of NAS 901A, 901B, . . . are connected to the network 102 so that each client 101 is able to access the plurality of NAS 901A, 901B, . . . .

Each of the NAS 901A, 901B, comprises file access history tables 123A and 123B, . . . and user login history tables 301A and 301B, . . . , which have the same structure as the file access history table 123 (FIG. 2) and the user login history table 301 (FIG. 3) respectively of the first embodiment. Further, the reference source candidate table 401 is disposed in either one of the NAS 901A and 901B, ....

Figure 10:
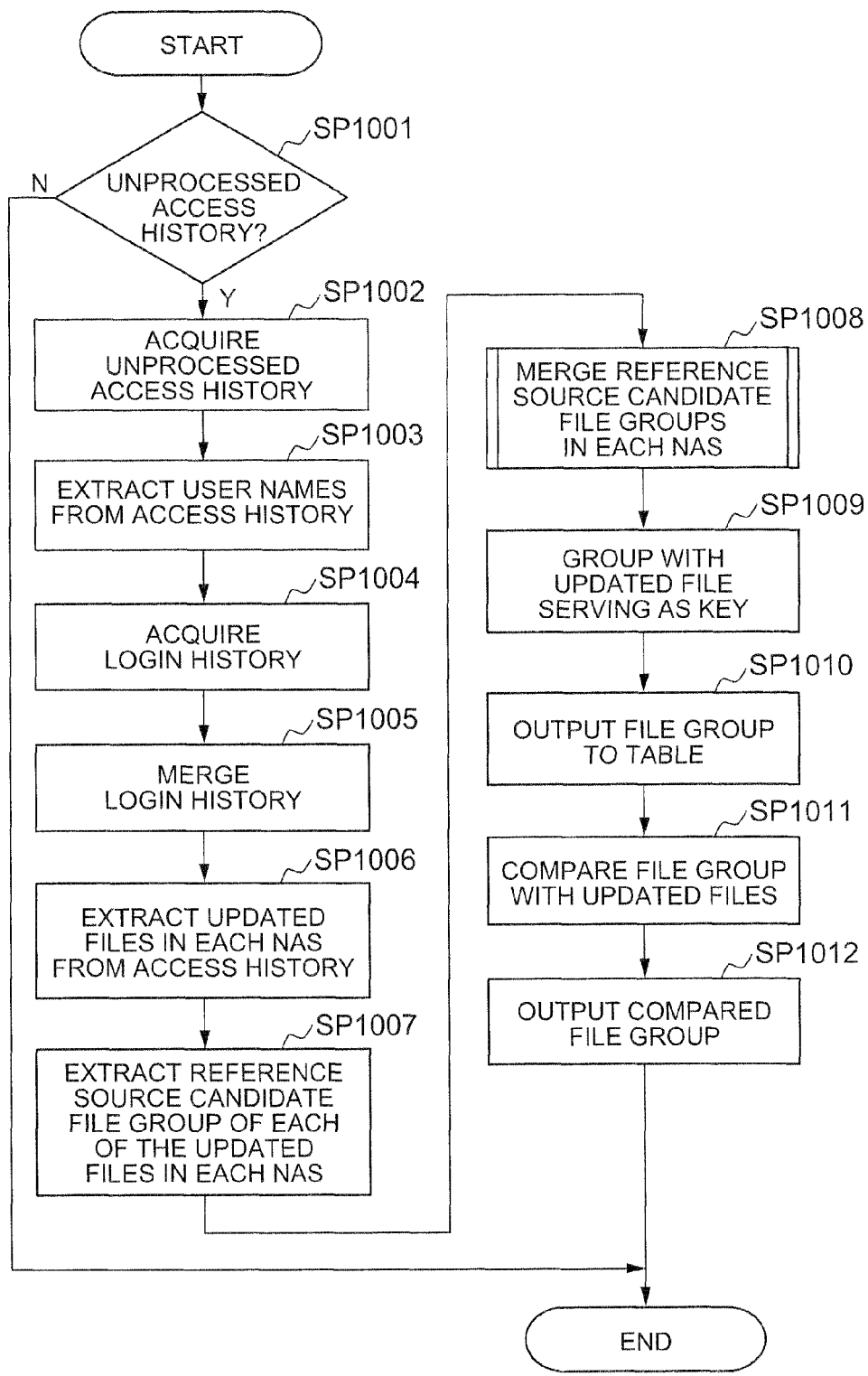
FIG. 10 is a flowchart showing a processing procedure for the reference source candidate detection processing according to the third embodiment.

FIG. 10 shows a processing procedure for the reference source candidate detection processing according to the third embodiment, which is executed by a file access history management unit 901A of the NAS 103A that comprises the reference source candidate table 401. The file access history management unit 901A executes the reference source candidate detection processing shown in FIG. 10 at regular intervals on the basis of a control program which is stored in memory (not shown) provided in the network node controller 105A.

That is, upon starting the reference source candidate detection processing, the file access history management unit 901A first acquires the file access history tables 123A, 123B, ..., which are held by its own NAS and the other NAS 103B, respectively, and references the file access history tables 123A, 123B, ... to judge whether these tables contain entries that have not undergone the processing of steps SP 1002 to SP 1012 (described subsequently) (SP 1001).

When this judgment yields a negative result, the file access history management unit 901A terminates the reference source candidate detection processing. In contrast, when this judgment yields an affirmative result, the file access history management unit 901B acquires file access history tables 123A, 123B, which are held by its own NAS and the other NAS 103B respectively, and reads information of all of the corresponding entries from these file access history tables 123A, 123B, (SP 1002).

Further, the file access history management unit 901A detects all of the user names stored in the user name fields 123D of these entries (SP 1003).

The file access history management unit 901A subsequently acquires user login history tables 301A, 301B, which are held by its own NAS and the other NAS 103B, ..., and reads the login time and logout time when each of the users with the user names detected in step SP 1003 logs onto the corresponding NAS 103A, 103B, ... from the user login history tables 301A, 301B, ... (SP 1004).

The file access history management unit 901A merges the login and logout times to each of the NAS 103A, 103B, ... acquired in step SP 1004 for each of these users, and thus acquires the widest time range from login to logout (SP 1005). More specifically, the file access history management unit 901A sets the earliest login time among the login times to each of the NAS 103A, 103B, ... as the merge result login time and sets the last logout time among the logout times from each of the NAS 103A, 103B, ... as the merge result logout time.

The file access history management unit 901A subsequently references the corresponding file access history tables 123A, 123B, ... in each of the NAS 103A, 103B, and detects all of the updated files for each of the users with the user names detected in step SP 1003 (SP 1006).

The file access history management unit 901A also detects, for the updated files of each user detected in step SP 1006 in each of the NAS 103A, 103B, ... all of the reference source candidate files for these updated files (SP 1007). Such detection of the reference source candidate files of each of the updated files is performed based on the file open operation time and file close operation time in the access events in which the target updated files are updated.

The file access history management unit 901A subsequently merges into one all of the reference source candidate files of all of the updated files in each of the NAS 103A, 103B, ... detected in step SP 1003 (which are called a 'reference source candidate file group' hereinbelow) (SP 1008).

Further, the file access history management unit 901A subsequently stores the target updated file and the reference source candidate files of each of the updated files obtained through the merging of step SP 1008 as respective file groups (SP 1009).

The file access history management unit 901A subsequently processes steps SP 1010 to SP 1012 in the same way as steps SP 509 to SP 511 in FIG. 5 and then terminates the reference source candidate detection processing.

Figure 11:
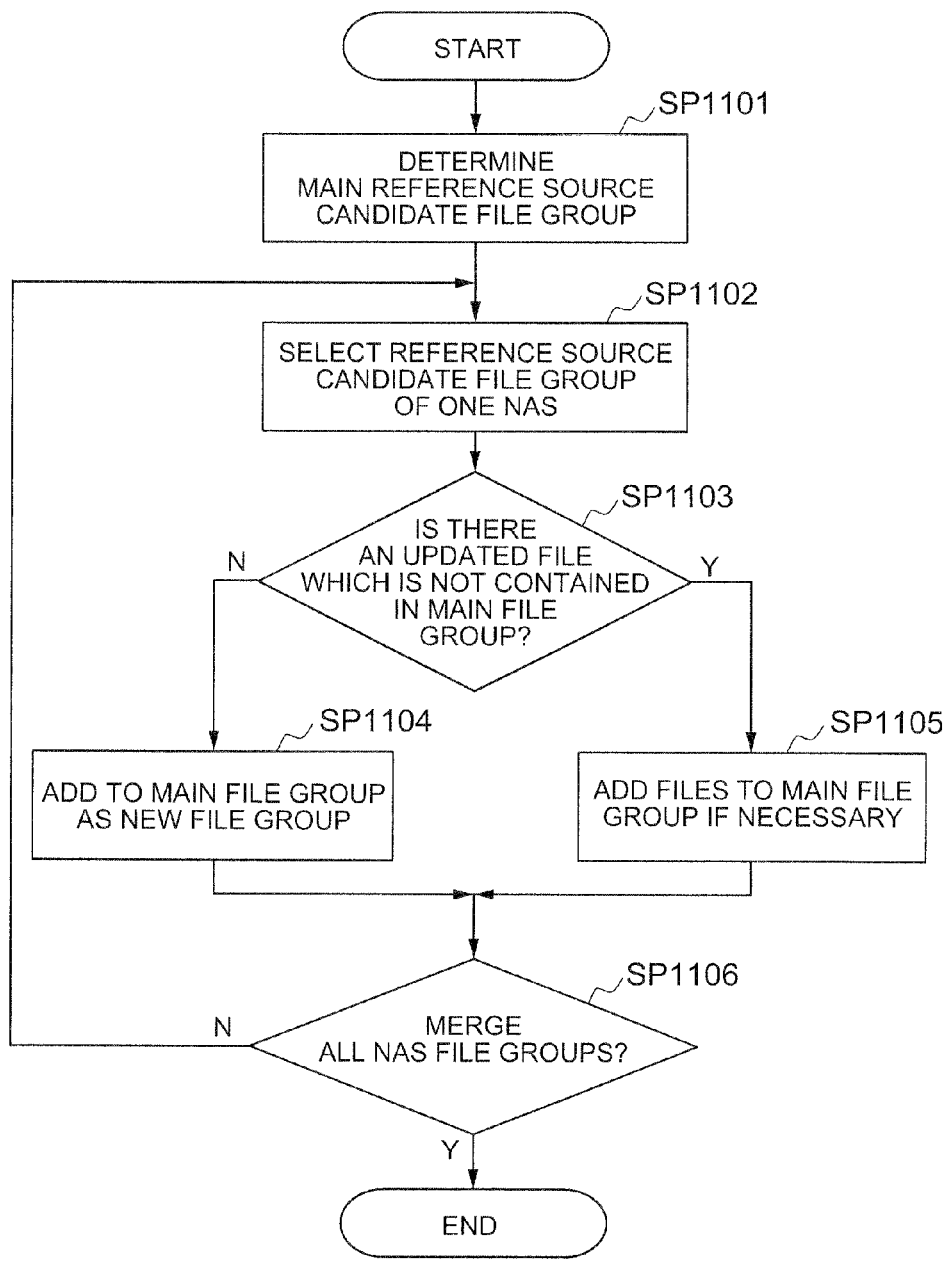
FIG. 11 is a flowchart showing a processing procedure for merge processing.

FIG. 11 shows specific details of the processing by the file access history management unit 901A in step SP 1008 of the reference source candidate detection processing according to the above embodiments.

The file access history management unit 901A starts the merge processing upon advancing to step SP 1008 of the reference source candidate detection processing and first selects one of all of the NAS 103A, 103B, ..., as a master and determines all of the reference source candidate files of all the updated files (called the 'reference source candidate file group' hereinbelow) in the NAS selected as the master (the NAS 103A here), as the main reference source candidate file group (SP 1101).

The file access history management unit 901A subsequently selects the reference source candidate file group of the one NAS 103B, ... excluding the master (SP 1102), and judges whether an updated file whose reference source candidate file is contained in this reference source candidate file group but whose reference source candidate file group is not contained in the main reference source candidate file exists (SP 1103).

Further, upon obtaining a negative result in this judgment, the file access history management unit 901A adds the reference source candidate files of all the updated files, whose reference source candidate file is contained in the reference source candidate file group selected in step SP 1102 but not contained in the main reference source candidate file, to the main reference source candidate file group (SP 1104).

In contrast, upon obtaining an affirmative result in the judgment of step SP 1103, when a reference source candidate file which is of the same updated file and is contained in the reference source candidate file group selected in step SP 1102 but not contained in the main reference source candidate file exists, the file access history management unit 901A adds the reference source candidate file to the main reference source candidate file (SP 1105).

Thereafter, the file access history management unit 901A judges whether the processing of steps SP 1102 to SP 1105 has been performed on all of the other NAS 103B, ... (SP 1106).

The file access history management unit 901A returns to step SP 1102 upon obtaining a negative result in this judgment and then repeats steps SP 1102 to SP 1106 in the same way.

The file access history management unit 901A subsequently terminates the merge processing upon obtaining a negative result in the judgment of step SP 1106 by completing the merge processing of steps SP 1102 to SP 115 for all of the other NAS 103B, ....

As mentioned earlier, according to this embodiment, when a plurality of NAS 103A, 103B, ... exist in the network 102, the reference source candidate file groups for the updated files are extracted from each of the NAS 103A, 103B, ... and reference source candidate file groups for each of the updated files are detected after merging the reference source candidate file groups of the updated files in each of the NAS 103A, 103B, .... Hence, the detection of the files which could have been referenced when the updated files were updated (reference source candidate files) can be performed easily while taking the whole of the network system 900 as the target.

(4) Further Embodiments

The first to third embodiments were described in terms of a case where the present invention is applied to NAS 103, 103A, and 103B, ..., which are configured as per FIG. 1 or FIG. 9. However, the present invention is not limited to such an application and can also be widely applied to storage devices which have a variety of other configurations and are fitted with a file access service function that supplies files to a client in response to a request from the client.

Moreover, the first to third embodiments above were described in terms of a case where a function of an access history management unit for managing the access history of the client PC 101 with respect to individual files stored in the NAS 103, 103A, 103B, ..., and a function of a file detection unit which detects a file accessed before an updated file is updated as the reference source for the updated file (reference source candidate file) among the files stored in the NAS 103, 103A, 103B, ... on the basis of information of the access history, are provided to the file access history management units 112, 151, 901A, and 901B, ... of the network node controllers 105, 105A, 105B, ... but the present invention is not limited thereto. The function of the file detection unit may also be provided in an external device (the management server 104, for example) that is outside the NAS 103, 103A, 103B, ... for example.

INDUSTRIAL APPLICABILITY

The present invention can be applied widely to storage devices having various configurations that supply files to client PCs.

The invention claimed is:

1. A file detection device, included in a network node controller, for detecting a specified file among a plurality of files stored in a storage device, comprising:
an access history management unit for managing an access history of a client with respect to individual files that constitute the plurality of files; and
a file detection unit for detecting a file, which is accessed between a time when a corresponding user logs into the storage device and a time when any of the plurality of files is updated on the basis of information of the access history, as a reference source candidate for the updated file,
wherein the access history management unit receives a file access request from the client and provides the client with file access services that provide the client with a file designated by the file access request among the plurality of files stored in the storage device,
wherein the network node controller constitutes a network connection storage device together with the storage device, and
wherein the network node controller is connected to the client via a network.

2. The file detection device according to claim 1, wherein the file detection unit determines, for each file detected as a reference source candidate, a degree of matching between the updated file and the file detected as the reference source candidate for the updated file, and presents to the user the determined degree of matching for each file detected as a reference source candidate.

3. The file detection device according to claim 1, wherein the file detection unit detects, as a reference source candidate for the updated file, a file among the plurality of files that is accessed in the same time zone as the updated file, on the basis of the information of the access history.

4. The file detection device according to claim 1, wherein a set, which is constituted by the storage device and the
access history management unit for managing the access history of a client with respect to individual files that constitute the plurality of files stored in the storage device, is provided in a plurality, and
wherein the file detection unit acquires information of the access history managed by each of access history management units, detects, as a reference source candidate for the updated file, a file that is accessed between a time when a corresponding user logs into the storage device and a time when any of the plurality of files is updated, for each of storage devices, on the basis of the acquired information of the plurality of access histories, and merges the detection results for each of the storage devices with each of the updated files.

5. A file detection method, implemented in a network node controller, for detecting a specified file among a plurality of files stored in a storage device, comprising:
a first step of managing an access history of a client with respect to individual files that constitute the plurality of files; and
based on the information of the access history,
wherein the storage device exists in a plurality;
in the first step, the access history of a client with respect to individual files that constitute the plurality of files stored in the storage device is managed for each of the storage devices; and
in the second step, information of the access history of each of storage devices is acquired, and a file that is accessed between a time when a corresponding user logs into the storage device and a time when any of the plurality of files is updated is detected as a reference source candidate for the updated file, for each of the storage devices on the basis of the acquired information of the plurality of access histories, and detection results for each of the storage devices are merged with each of the updated files,
wherein the network node controller constitutes a network connection storage device together with the storage device, and
wherein the network node controller is connected to the client via a network.

6. The file detection method according to claim 5, wherein, in the second step, a degree of matching between the updated file and a file detected as a reference source candidate for the updated file is determined for each file detected as the reference source candidate, and the determined degree of matching for each file detected as a reference source candidate is presented to the user.

7. The file detection method according to claim 5, wherein, in the second step, a file among the plurality of files that is accessed in the same time zone as the updated file is detected as a reference source candidate for the updated file, on the basis of the information of the access history.

* * * * *